United States Patent
DeCord, Jr.

(10) Patent No.: US 6,876,899 B2
(45) Date of Patent: Apr. 5, 2005

(54) METHOD FOR AUTOMATIC RISER GATE REMOVAL COMPENSATING FOR VARIANCE IN CASTING

(75) Inventor: Frank D. DeCord, Jr., Alabaster, AL (US)

(73) Assignee: Vulcan Engineering Co., Inc., Birmingham, AL (US)

( * ) Notice: Subject to any disclaimer, the term of this patent is extended or adjusted under 35 U.S.C. 154(b) by 0 days.

(21) Appl. No.: 10/306,287

(22) Filed: Nov. 27, 2002

(65) Prior Publication Data
US 2003/0139841 A1 Jul. 24, 2003

Related U.S. Application Data
(60) Provisional application No. 60/349,976, filed on Jan. 18, 2002.

(51) Int. Cl.$^7$ ............................ G06F 19/00; B24B 49/00
(52) U.S. Cl. ............................ 700/146; 700/90; 700/159; 451/5
(58) Field of Search ............................ 700/90, 95, 117, 700/159, 160, 163, 145–147; 451/5, 6, 10; 901/41

(56) References Cited

U.S. PATENT DOCUMENTS

| | | |
|---|---|---|
| 4,221,514 A | 9/1980 | Pavlovsky |
| 4,501,094 A | 2/1985 | Veale |
| 4,520,597 A | 6/1985 | Lindberg |
| 4,603,511 A | 8/1986 | Komatsu et al. |
| 4,637,775 A | 1/1987 | Kato |
| 4,777,769 A * | 10/1988 | McLaughlin et al. .......... 451/5 |
| 4,894,597 A | 1/1990 | Ohtomi |
| 5,077,941 A | 1/1992 | Whitney |
| 5,119,600 A | 6/1992 | Chikatsune et al. |
| 5,126,645 A | 6/1992 | Yoshimi et al. |
| 5,146,714 A * | 9/1992 | Luber ............................ 451/5 |
| 5,299,389 A | 4/1994 | Yonaha et al. |
| 5,509,848 A * | 4/1996 | Shimbara ...................... 451/24 |
| 5,799,135 A * | 8/1998 | Terawaki ..................... 700/258 |
| 6,165,057 A * | 12/2000 | Gill, Jr. ....................... 451/287 |

* cited by examiner

Primary Examiner—Jayprakash N. Gandhi
(74) Attorney, Agent, or Firm—Smith, Gambrell & Russell, LLP (57) ABSTRACT

A method of finishing like castings wherein the exact dimensions of the casting are not known requires the steps of traversing the casting along a fixed path impinging excess material on a reduction apparatus such as grinder at a fixed location such that a defined witness is produced on the excess material, measuring the difference from the witness to the casting parent material and adjusting the fixed path to remove the excess material to within a specified tolerance.

19 Claims, 8 Drawing Sheets

METHOD FOR AUTOMATIC RISER GATE REMOVAL COMPENSATING FOR VARIANCE IN CASTING

This application claims priority from U.S. Provisional Application No. 60/349,976, filed on Jan. 18, 2002.

FIELD OF THE INVENTION

The present invention relates generally to the field of metal casting. More particularly the present invention relates to the finishing of metal castings when removed from the mold. In even greater particularity the present invention relates to the removal of riser remnants after a cast part has been removed from the mold and to a process for perfecting the removal of such an inconsistency from the surface of a cast part.

BACKGROUND OF THE INVENTION

In the casting arts, molten metal is poured into a mold through an opening in the top of the mold with a certain excess metal filling the channel to the mold cavity. When multiple parts are cast in the same casting vessel, the mold will include channels in the form of a sprue to each cavity for each part. Additionally, molten metal may solidify in vents and other areas and constitutes an imperfection of excess material on the surface of the casting. The excess metal, such as those referred to as risers or gates, may be partially removed after the cast part or casting has been sufficiently cooled however further machining, usually by grinding, is necessary to remove the remaining excess material from the casting. Note that the excess material may be regular or irregular in shape in each dimension and may be on a casting surface that is planar or arcuate or irregular itself.

Metal castings for the same part are inherently not dimensionally identical from casting to casting. These differences arise from mold variation, casting conditions, cooling rate, and other factors. Due to these variances, it is difficult to automate excess material removal using a device which follows a controlled predetermined path such as a robot. Specifically it is difficult to maintain tight tolerances between the casting and the ground surface of the excess, sometimes referred to as the witness, such that the proper amount of excess material is removed. For example a grinding tolerance may be flush to 0.060", the robot is accurate to +/−0.002", and the casting tolerance is +/−0.050". With these parameters it will be impossible to grind to flush to 0.060" without compensation.

SUMMARY OF THE INVENTION

Castings with significant variation (greater than the required finished tolerance) can be impossible to grind with a robot that follows a fixed path. This method corrects this problem by inspecting the part after the relationship between the grinder and the casting has been established in the preliminary grind. The robot path is then adjusted to correct this relationship so that the desired grinding tolerance is achieved.

It is an object of the present invention to provide means for removal of excess riser material from a casting to within a specified tolerance where the dimensions of the casting are subject to variation.

It is a further object of the present invention to provide means for the removal of excess riser material from a casting to within a specified tolerance where the distance of the grinding media from the casting surface are not initially accurately known.

It is a further object of the present invention to provide a control mechanism for a robotic grinding system that will allow it to remove casting imperfections to within a required tolerance when an initial imperfection dimension is not known.

These and other objects of the present invention are accomplished with the use of an industrial robot or other controllable machine with controller, tooling to accurately locate a casting, measurement feedback devices, a computer, and grinding equipment. The tooling comprises a set of holding devices to accurately position the casting during the grinding process. The casting may be fixed either in relation to the robot or to the earth such that either the casting or the material removal device can be carried by the robot. Once the location of the casting is fixed, the industrial robot carrying the moving piece is programmed to move along a path of coincidence between the casting and the grinder greater than the specified tolerance from the assumed surface of the casting, thereby removing a portion of the excess riser material and defining a witness surface at which no further material will be removed by traversing the same pass. The measurement feed back device is then used to determine the distance of the points on the edge of the witness from the surface of the casting and these measurements are used by the computer to calculate a new path of travel for the robot that will create coincidence within the desired tolerance to remove the excess material.

BRIEF DESCRIPTION OF THE DRAWINGS

Apparatus employed in the method of removing excess material and the manner in which the apparatus is employed are depicted in the accompanying drawings, which form a portion of this disclosure and wherein.

DESCRIPTION OF A PREFERRED EMBODIMENT

Figure 1:
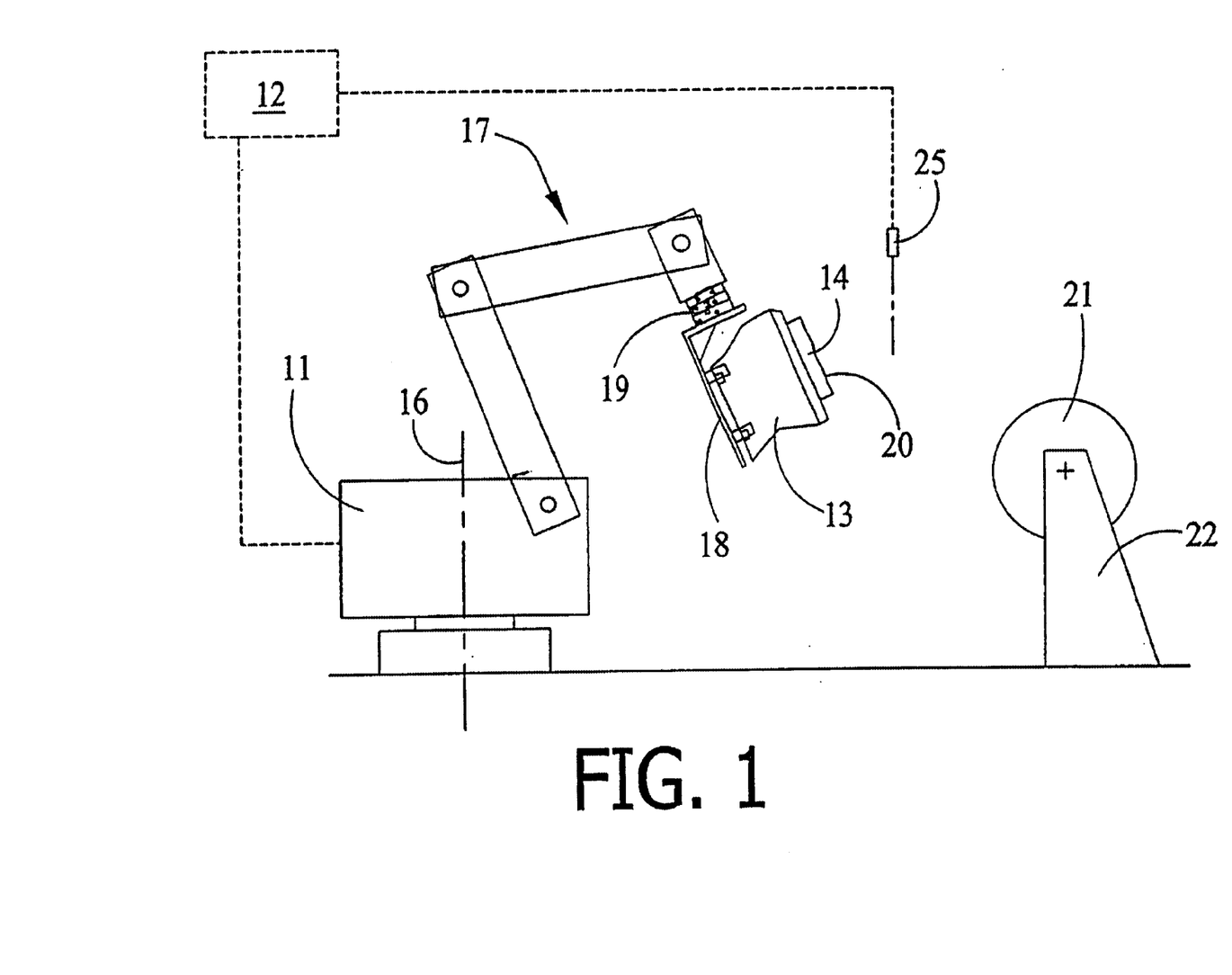
FIG. 1 is a schematic depiction of the robot carrying the casting relative to the removal machine, depicted as a grinder, and the measurement device.

Referring to the drawings for a clearer understanding of the invention, note that each of the components used in the current method is currently in use in other applications such that no single component needs to be modified other than by software programming. Rather it is the combination of components and their specific method of use in this application which is novel. Referring to FIG. 1, it may be seen that an industrial robot 11 under the control of a programmable computer 12 is utilized to position a casting 13 to remove the riser material 14. While the drawings depict the material and casting in two dimensional form, it will be appreciated that both the excess 14 and the casting 13 are three dimensional objects and are variable in height, width, and contour. It will be appreciated that industrial robot 11 has a pivot axis indicated at 16 and an articulated boom 17, thus robot 11 may rotate about the axis 16 and extend or retract boom 17 in accordance with instructions received from the computer 12 or a manual override. It will be appreciated that the described robot 11 is but one embodiment capable of use in the present invention. By way of example and not by way of limitation, it will be appreciated that a reciprocating robot moving along a controllable path, a cartesian robot using a gantry system, a CNC machine, a programmable table, or any other precisely controllable industrial machine may be used.

As indicated above, current industrial robots are able to follow a repeatable programmed path, by way of example to within a tolerance of +/−0.002" (two one thousands of an inch), therefore industrial robot 11 can be controlled by computer 12 to follow a very precise path once a casting 13 has been positioned on the robot 11. To position the casting 13 on the articulated boom 17, a fixture or tooling 18 capable of grasping casting 13 and retaining casting 13 in a fixed position relative to the fixture 18 is mounted to the boom 17, preferably by rotary connection 19, such that the fixture 18 and casting 13 can be precisely positioned in all spatial directions for movement along a specified path. As noted with respect to the casting 13 and excess material 14, it is expected that the path needed to remove excess material 14 will be a non-linear path which can be generated by selecting expected points along a theoretical path for a given surface. In one example, a grinding wheel 21, mounted for rotation about a horizontal axis or other known axis on a support 22, is located at a known distance from robot 11 such that a calculated fixed path relative to the surface of the grinding wheel 21 may be determined for fixture 18.

While a grinding wheel 21 is utilized as an exemplary device for removing the excess riser material 14, it will be appreciated in the art that any form of removal device such as a grinding belt, grinding disc, shear, planing device or the like may be used in actual practice depending upon the excess material to be removed. It is also understood that the removal device may be carried by the controlled machine and the casting 13 fixed on support 22. Of course, regardless of the tool used to remove excess material 14 when the normal processes occur, a certain amount of wear on the removal tool is occasioned which must be considered and compensated for on the selected tool. Further, for a specified casting 13 and the excess material 14 thereon, more than one removal tool may be used, e.g. a rotary grinder and a belt sander may sequentially be used. Hence, the "path" may be a path relative to a single removal machine or multiple removal machines and may entail two or more sub paths relative to each machine.

Figure 2A:
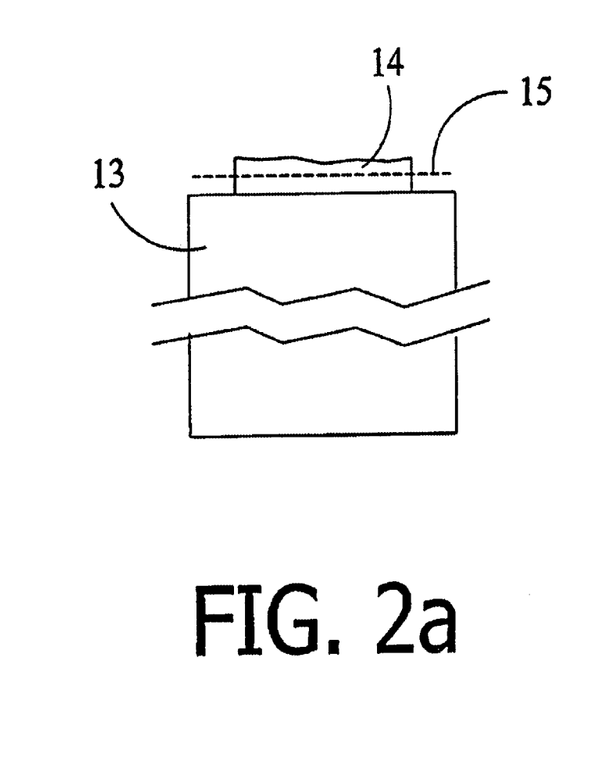
FIGS. 2a and 2b are schematic representations of the riser material to be removed and the initial grinding path.
Figure 2B:
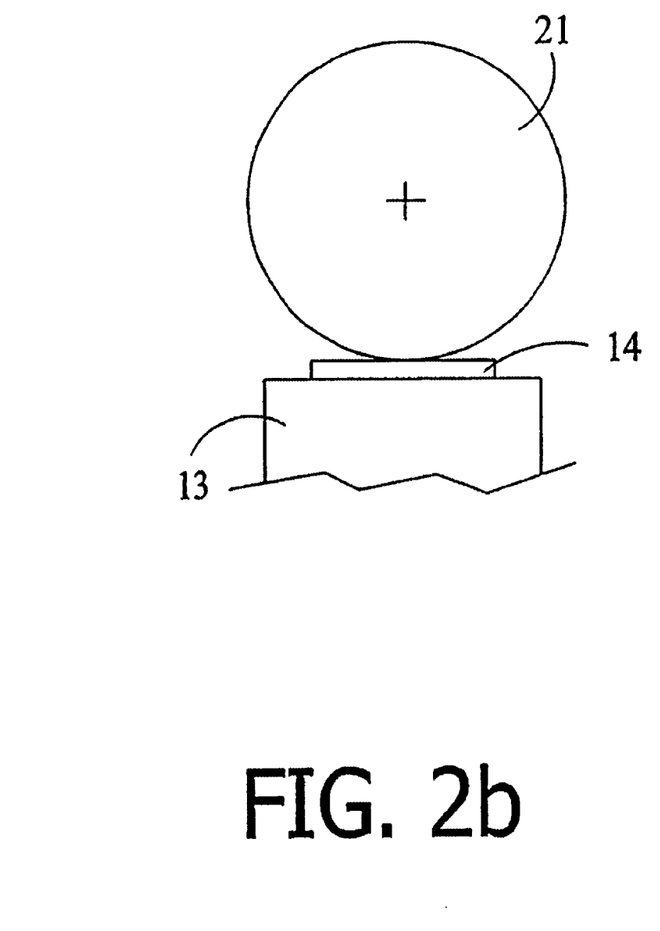

The gross dimensions of the casting 13 are typically known to within +/−0.050" (five one hundredths of an inch), thus, for a selected dimension, casting 13 can be secured to fixture 18 and a fixed path determined such that a riser 14 extending from the casting at a distance in excess of the grinding tolerance from the gross dimension will be engaged by the grinder 21. Thus, with a selected grinding tolerance of +/−0.060" (six one hundredths of an inch) a fixed path calculated for the robot 11 and fixture can safely bring the casting 13 with an outer witness surface 20 of the riser 14 proximal the grinder 21 at a distance of not less than 0.11 inches. Repeated passes of the casting 13 along this path will remove substantially all of the unwanted material in excess of this distance such that after a number of passes no more riser material 14 is removed. This process is illustrated pictorially in FIGS. 2a and 2b. At this point the grinder surface and the witness surface 20 of the riser 14 should have substantially the same relation 15 to the robot 11 and fixture, hence the witness surface 20 relative to the grinder 21 and robot 11 are now known. However, the dimensional relation between the casting parent material and the grinder surface are still unknown.

Figure 3A:
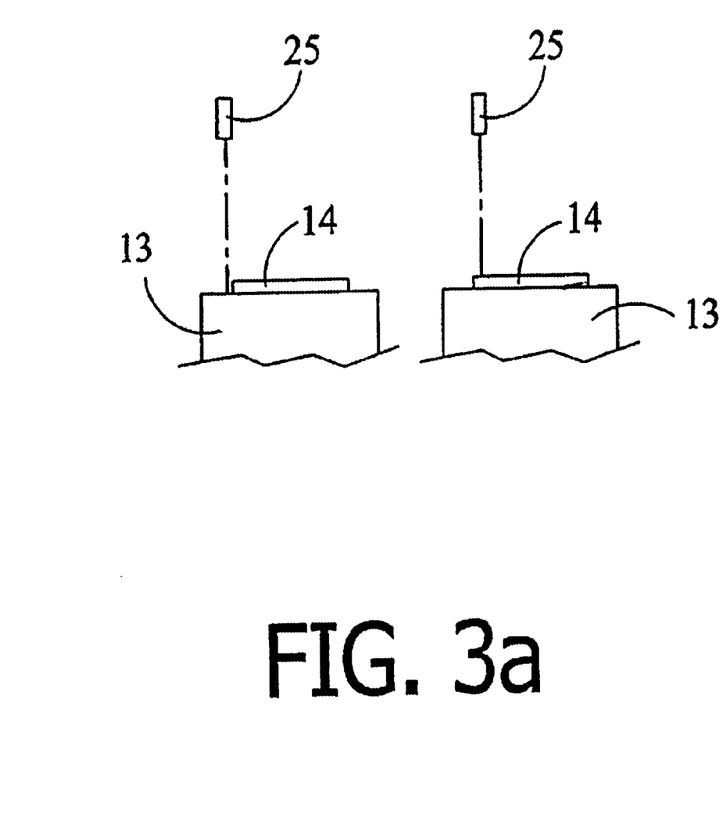
FIGS. 3a and 3b are schematic representations of the measurement device inspecting the witness at the edges thereof relative to the casting parent material.
Figure 3B:
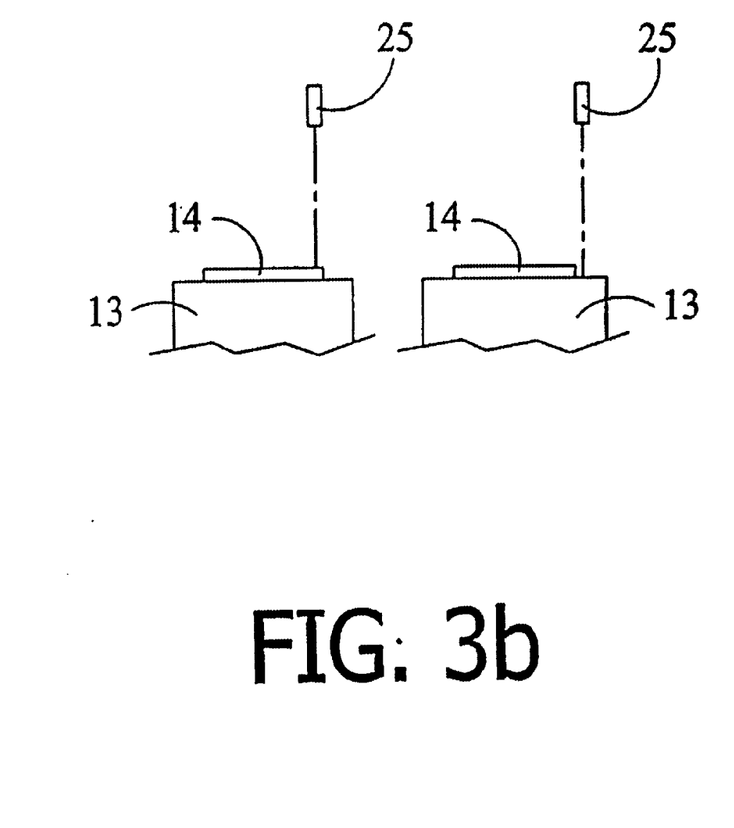
Figure 4A:
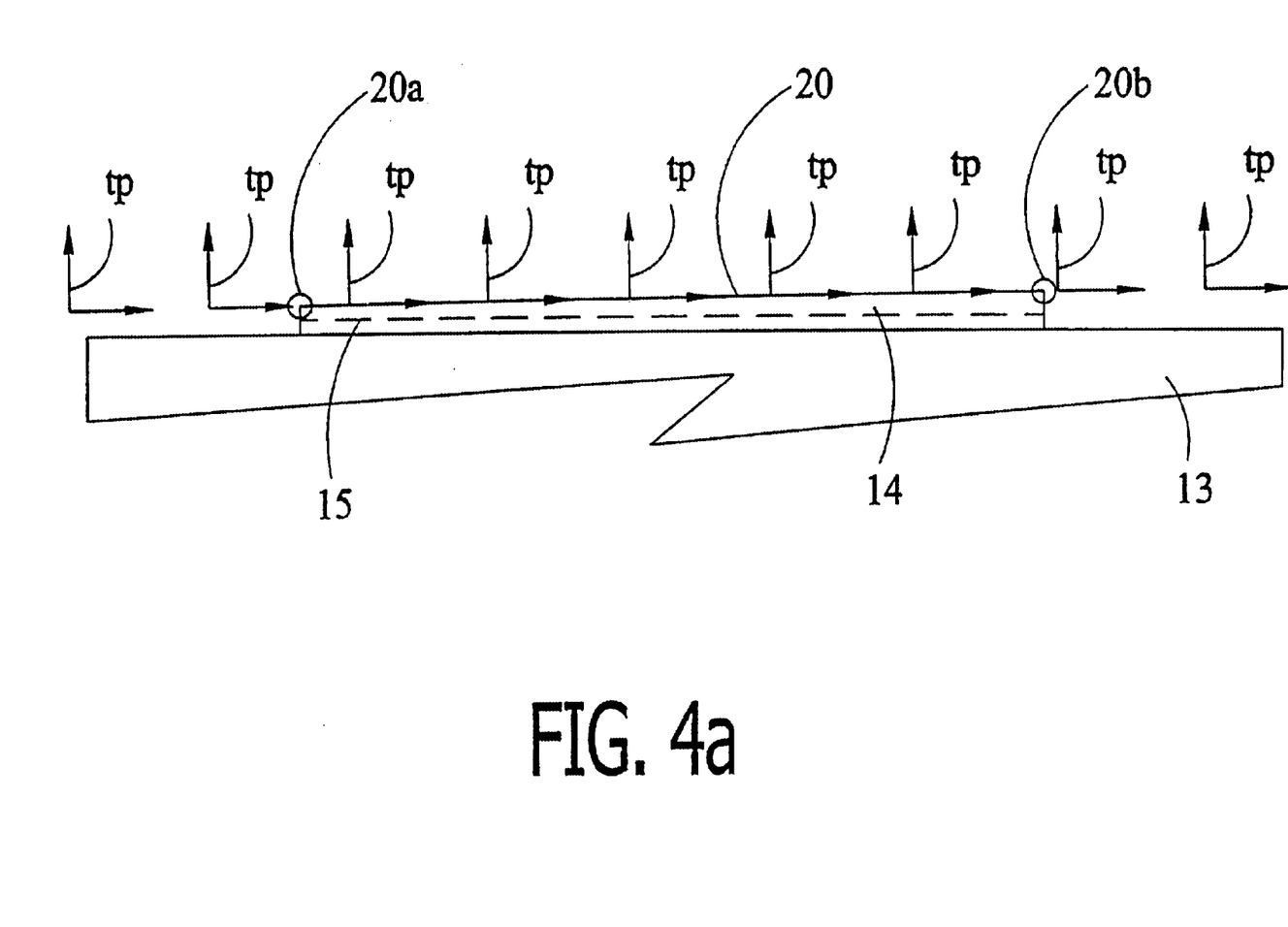
FIGS. 4a and 4b are schematic representations of the teach point and offset relations.

The robot 11 is then used to position the casting 13 relative to a measurement device 25 such as a laser measuring system, vision measuring system, or a Linear Voltage Displacement Transducers (LVDT). The casting 13 is positioned such that the witness surface 20 of the riser material 14 is movable relative to the measurement device 25 such that the measurement device can determine the difference between the casting 13 and the ground surface, i.e. offset dimensions, on the leading edge 20a and trailing edge 20b of the riser witness 20 as well as other points, teach points, tp, necessary to establish a path offset from the original path as shown in FIG. 4a. These dimensions are stored for later use by computer 12. This process, as illustrated in FIG. 3a, is repeated for all the areas that must be ground with as many measurements as may be necessary to complete a definition of the displacement of the witness 20 from the casting body 13.

Figure 4B:
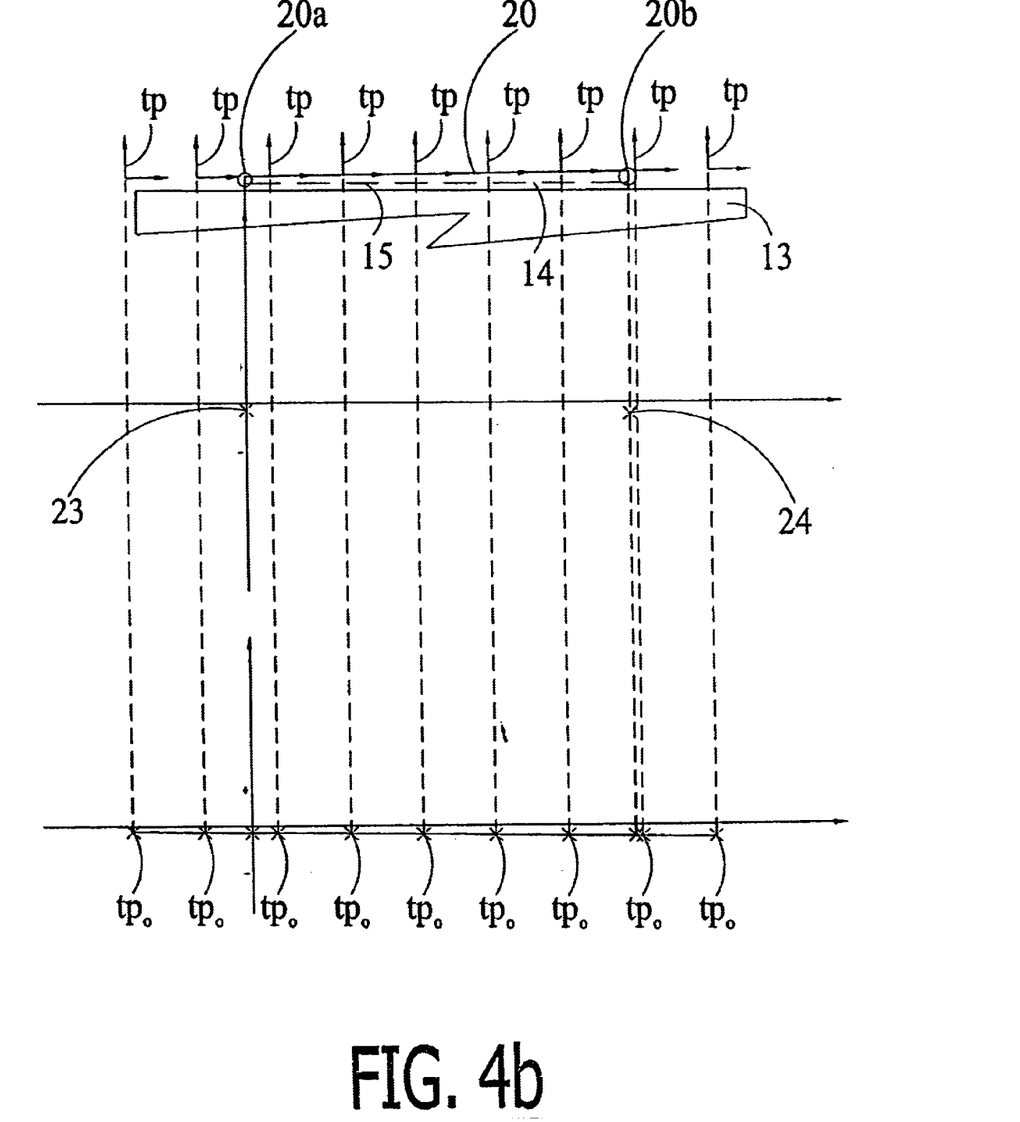

Computer 12 then uses a computer program that calculates the linear offset from the pre-programmed fixed paths using the offset dimensions from the measuring step. The two offset dimensions calculated from the measuring step above are used along with the pre-programmed positions of the leading edge 20a and trailing edge 20b of the witness 20 to generate a linear offset of the pre-programmed path. The offset, $tp_o$, is calculated for every teach point, tp, in the path which may or may not be the same offset depending on the witness 20 heights at the start 20a and finish 20b, as shown in FIG. 4b.

Figure 5A:
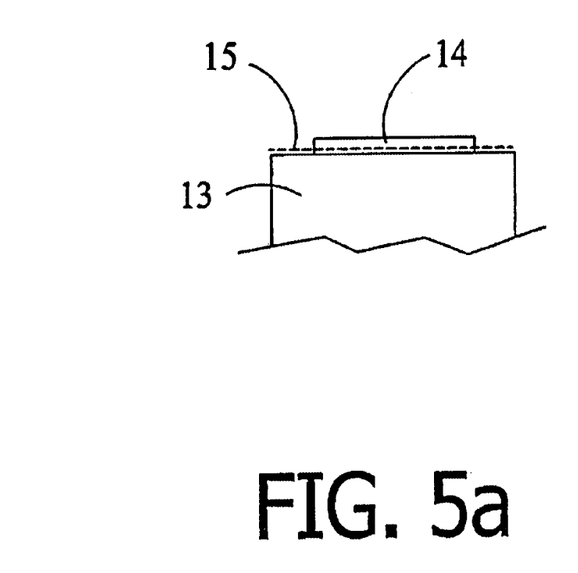
FIGS. 5a and 5b are schematic representations of the final witness height.
Figure 5B:
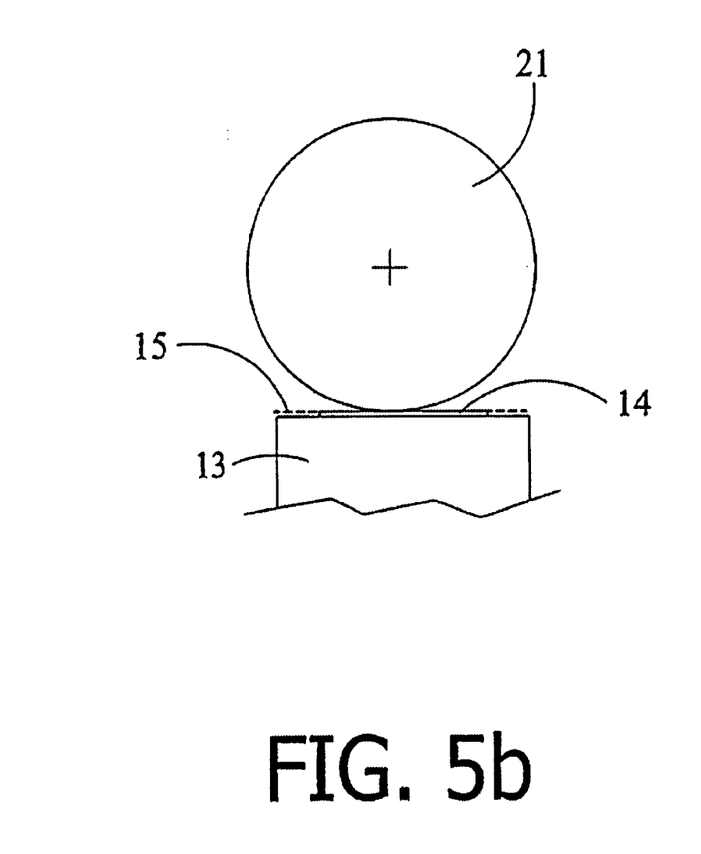
Figure 6A:
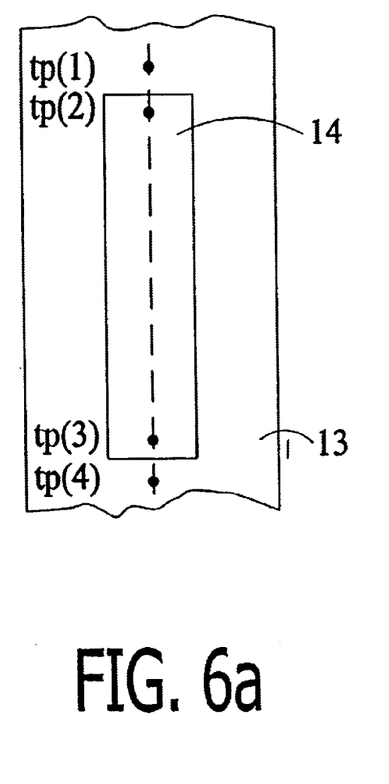
FIGS. 6a and 6b are end views of the casting and riser to be engaged by the grinding device.
Figure 6B:
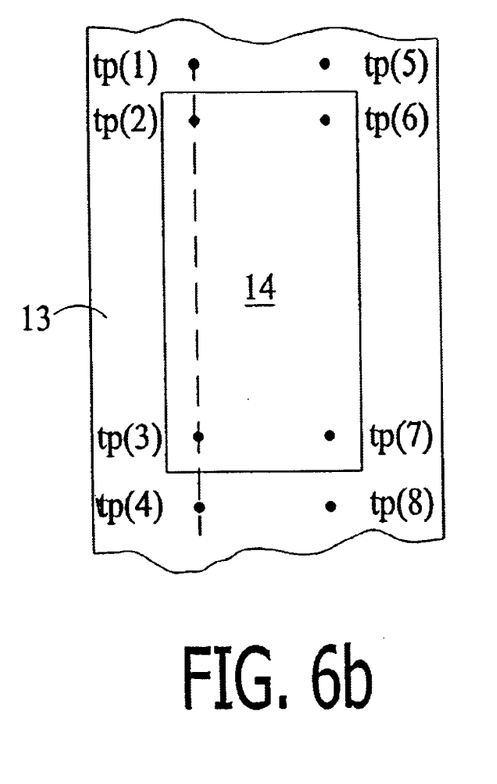
Figure 7:
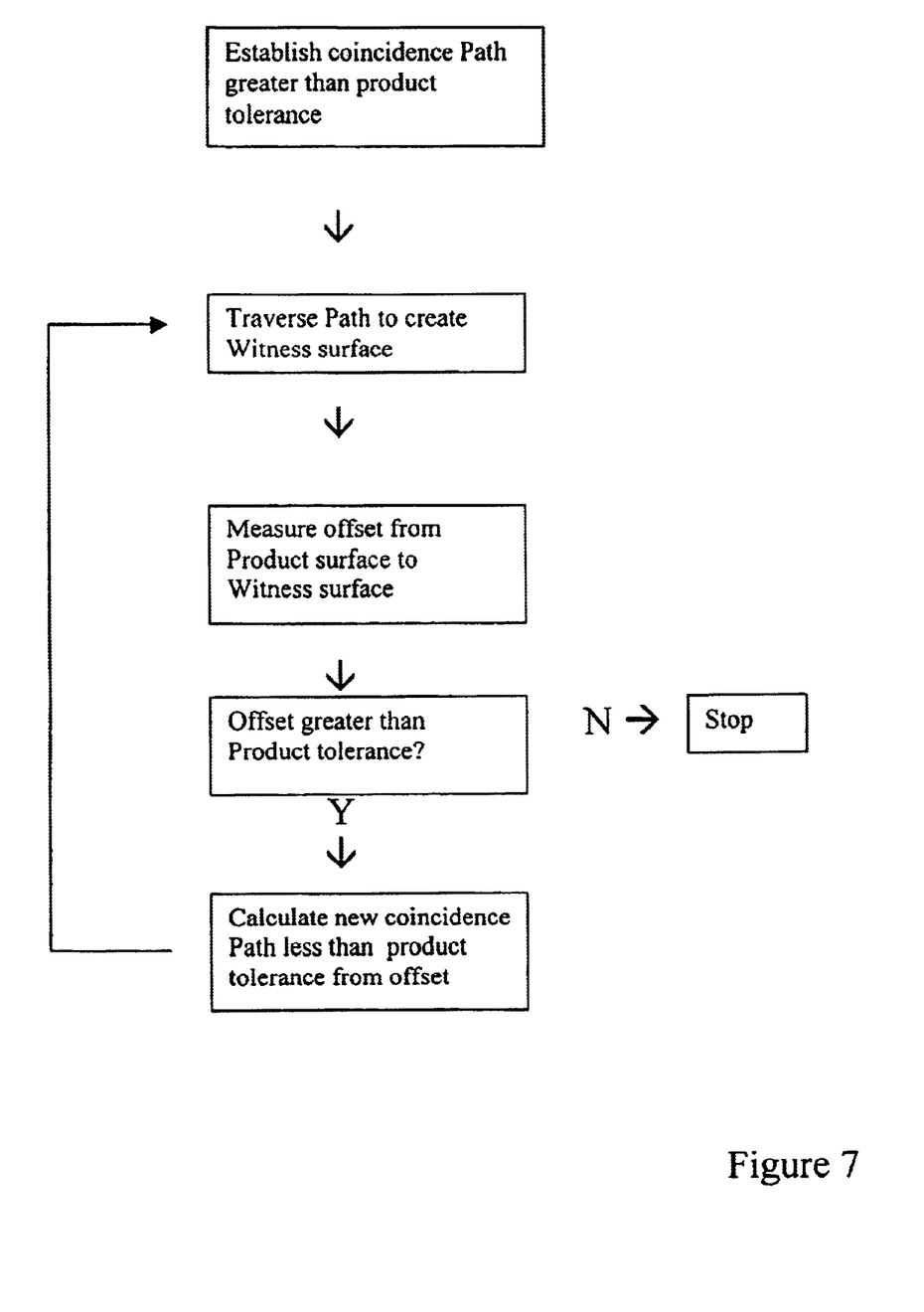
FIG. 7 is a basic flow chart of the method.

A new robot path is generated within the computer 12 and is uploaded to the robot 11. The new programmed path contains new robot teach points tp with the calculated offsets. Robot 11 runs the program to traverse the new path carrying the casting 13 past the grinding wheel 21 to remove the remaining excess material 14 to within the desired grinding tolerance as shown in FIGS. 5a and 5b. The same process is repeated for each surface imperfection caused by an excess of material 14 as discussed above. In addition, comparing FIGS. 6a and 6b, it should be noted that the process of grinding the riser 14 is influenced by the size or width of the riser 14. For example, in FIG. 6a, measurement device 25 will be able to analyze the riser 14 along teach points tp(1) through tp(4), and thereby have the grinding wheel 21 trim the riser 14 accordingly. However, looking to FIG. 6b, the width of the riser 14 requires that the grinding wheel 21 follow a second iteration. In particular, the process described above will be followed, and grinding wheel 21 will engage the riser 14 through tp(1) through tp(4). Additionally, the casting 13 will then be rotated or otherwise moved, and the process described above will once again be followed such that teach points tp(5) through tp(8) are analyzed by measurement device 25, and the grinding wheel 21 will engage the riser 14 accordingly. The casting 13 is released from the fixture and the robot 11 is reset to the pre-calculated fixed path and the process is repeated for the next casting.

It will be appreciated that the above method may be practiced with a variety of machinery components and is not dependant upon the specific components used as long as the components are capable of reproducible and fixed tolerances which can be utilized to compensate for the individual tolerances of the machines and castings. Thus, although there have been described particular embodiments of the present invention of a new and useful METHOD FOR AUTOMATIC RISER GATE REMOVAL COMPENSATING FOR VARIANCE IN CASTING, it is not intended that such references be construed as limitations upon the scope of this invention except as set forth in the following claims.

What is claimed is:

1. A method for removing excess material from a casting body wherein the casting dimensional tolerance is approximately equal to or greater than the required finished product tolerance, said method comprising the steps of:

a) establishing a fixed path of coincidence between a material removal station and a casting wherein the closest point of approach of a casting body exceeds the sum of the casting dimensional tolerance and the finished product tolerance;

b) iteratively causing the casting body and said removal station to come into coincidence along the fixed path to remove excess material until no further excess material is removed, thereby defining a witness surface on said excess material;

c) measuring the dimensional offset from the edge of said witness surface to the adjacent casting body on at least two points on said witness surface;

d) calculating an offset from said fixed path for each measured dimensional offset to determine a new path of coincidence between the casting body and said material removal station within said finished product tolerance; and e) traversing said new path until said excess material is reduced to less than the finished product tolerance.

2. The method as defined in claim 1 wherein said traversing step is accomplished using an industrial robot having a repeatability tolerance less than said finished product tolerance.

3. The method as defined in claim 1 wherein said establishing step and said calculating step are performed by a computer.

4. The method as defined in claim 3 wherein said traversing step is accomplished using a controllable machine for traversing said fixed and new path having a repeatability tolerance less than said finished product tolerance and operatively connected to said computer to receive instructions for traversing said fixed path and subsequently said new path.

5. The method as defined in claim 3 wherein said measuring step is accomplished using a precision measuring device, selected from the group of laser measuring devices and linear voltage displacement transducers, having an electronic output to said computer.

6. The method as defined in claim 1 wherein said fixed path allows the material removal station to remove excess material on the casting body at selected locations on the casting body to define a witness surface at each selected location.

7. The method as defined in claim 1 wherein said fixed path allows for coincidence between the casting body and more than one material removal station.

8. The method as defined in claim 1 wherein said fixed path includes sub paths.

9. The method as defined in claim 1 wherein said step d) further includes the step of:

calculating a translational offset from said fixed path.

10. The method as defined in claim 1 wherein said step d) further includes the step of:

calculating a rotational offset from said fixed path.

11. A method for removing excess material from a casting body comprising the steps of:

a) positioning the casting body such that any excess material thereon is accessible;

b) establishing a fixed path of coincidence between the casting body and a material removal station wherein the closest point of approach of the casting body positioned on said robot exceeds the sum of a specified casting dimensional tolerance and a finished casting tolerance and whereat said excess material is coincident said material removing station;

c) iteratively traversing said fixed path to remove excess material from specified locations on the casting body until no further material is removed, thereby defining a witness on said excess material at each said specified location;

d) measuring the distance from an edge of the witness at each location to the casting body at at least two points on said witness utilizing a measuring device selected from the group of laser measuring systems and linear voltage displacement transducers;

e) calculating an offset from said fixed path for each distance to determine a new path of coincidence between the casting body and said material removal station within said finished casting tolerance; and f) iteratively traversing said new path until said excess material is reduced to less than the finished casting tolerance.

12. The method as defined in claim 11 wherein said establishing step and said calculating step are performed using a computer.

13. The method as defined in claim 11 wherein said excess material is a by-product of casting the casting body.

14. The method as defined in claim 11 wherein step e) further comprises the step of:

calculating a translational offset.

15. The method as defined in claim 11 wherein step e) further comprises the step of:

calculating a rotational offset.

16. A method of finishing castings having excess material thereon wherein the exact dimensions of the casting are not known, said method comprising the steps of:

a) creating a movement of the casting along a fixed path;

b) impinging excess material appurtenant the casting on a reduction apparatus at a fixed location such that a defined witness is produced on the excess material;

c) measuring the difference from an edge of said witness to the adjacent casting material; and, d) adjusting the fixed path to remove the excess material to within a specified tolerance.

17. The method as defined in claim 16 wherein step a) further comprises the step of:

repositioning the casting using a robotic arm connected to a computer.

18. The method as defined in claim 16 wherein step b) further comprises the step of:

engaging the excess material with a grinding apparatus.

19. The method as defined in claim 16 wherein step c) further comprises the step of:

determining the height of the excess material above the desired surface level using a precision measuring device connected to a computer.

* * * * *